(12) United States Patent
Ehsani (10) Patent No.: US 9,376,782 B1
(45) Date of Patent: Jun. 28, 2016

(54) REPAIR AND STRENGTHENING OF PILES AND PIPES WITH FRP LAMINATES

(76) Inventor: Mohammad R. Ehsani, Tucson, AZ (US)

( * ) Notice: Subject to any disclaimer, the term of this patent is extended or adjusted under 35 U.S.C. 154(b) by 0 days.

(21) Appl. No.: 12/618,358

(22) Filed: Nov. 13, 2009

Related U.S. Application Data (63) Continuation-in-part of application No. 12/233,849, filed on Sep. 19, 2008, now abandoned.

(60) Provisional application No. 61/270,013, filed on Jul. 2, 2009, provisional application No. 61/207,849, filed on Feb. 18, 2009.

(51) Int. Cl.
  *E04B 2/00* (2006.01)
  *E04F 13/00* (2006.01)
  (Continued)

(52) U.S. Cl.
  CPC . *E02D 5/00* (2013.01); *B29C 53/00* (2013.01); *B29C 53/02* (2013.01); *B29C 53/04* (2013.01); *B29C 53/14* (2013.01); *B29C 53/32* (2013.01); *B29C 53/36* (2013.01); *B29C 53/56* (2013.01); *B29C 53/562* (2013.01); *B29C 53/58* (2013.01); *B29C 53/581* (2013.01); *B29C 53/60* (2013.01); *B29C 53/602* (2013.01); *B29C 63/00* (2013.01); *B29C 63/02* (2013.01); *B29C 63/04* (2013.01);
  (Continued)

(58) Field of Classification Search
  CPC ............... E02D 5/00; E02D 5/22; E02D 5/24; E02D 5/60; B29C 65/00; B29C 65/48; B29C 65/483; B29C 65/50; B29C 65/5057; B29C 65/54; B29C 53/00; B29C 53/02; B29C 53/04; B29C 53/14; B29C 53/32; B29C 53/36; B29C 53/56; B29C 53/562; B29C 53/58; B29C 53/581; B29C 53/60; B29C 53/602; B29C 63/00; B29C 63/02; B29C 63/04; B29C 63/08; B29C 63/10; B29C 63/18; B29C 63/22; B29C 63/26; B29C 63/30; B29C 63/32
  USPC .............. 156/1, 60, 71, 94, 187; 52/390, 725; 132/172, 178; 138/99, 97, 172; 264/36; 405/216, 211
  See application file for complete search history.

(56) References Cited

U.S. PATENT DOCUMENTS 2,373,885 A * 4/1945 Gast et al. ..................... 405/216
3,350,049 A * 10/1967 Reiland ........................... 249/48
(Continued)

FOREIGN PATENT DOCUMENTS

KR   10-2009-0053617 A    6/2009
WO            94-25702 A1  11/1994

*Primary Examiner* — Michael N Orlando
*Assistant Examiner* — Matthew Hoover
(74) *Attorney, Agent, or Firm* — Arjomand Law Group, PLLC (57) ABSTRACT

The present invention is a method for strengthening a vertical column, such as piles under piers and docks and for columns in bridges and buildings. A coiled FRP laminate is provided and wrapped in a helical fashion around the column, with the laminate overlapping itself. An epoxy resin coating is applied between the overlapping portions. The epoxy resin will then cure to form a substantially water tight shell. A plurality of spacers may be fixed to the column and adapted to hold the laminate a set distance away from the column. A plurality of sealing means is provided to seal the space between the shell and the column. A filler material may be pressurized to fill the space, penetrate cracks in the column, and displace water. Also, a plurality of rigid strengthening rods may be added between the column and the shell to further strengthen the column.

8 Claims, 4 Drawing Sheets

(51) Int. Cl.

| | |
|---|---|
| *B31B 1/60* | (2006.01) |
| *B29C 65/00* | (2006.01) |
| *B32B 37/00* | (2006.01) |
| *B29C 73/00* | (2006.01) |
| *B32B 43/00* | (2006.01) |
| *B29C 63/10* | (2006.01) |
| *B65H 81/00* | (2006.01) |
| *E04F 13/08* | (2006.01) |
| *F16L 55/18* | (2006.01) |
| *F16L 55/16* | (2006.01) |
| *F16L 9/00* | (2006.01) |
| *E02D 5/60* | (2006.01) |
| *E02D 31/00* | (2006.01) |
| *E02D 5/00* | (2006.01) |
| *E02D 5/24* | (2006.01) |
| *B29C 53/36* | (2006.01) |
| *B29C 53/58* | (2006.01) |
| *B29C 53/00* | (2006.01) |
| *B29C 53/14* | (2006.01) |
| *B29C 53/32* | (2006.01) |
| *B29C 53/60* | (2006.01) |
| *B29C 53/56* | (2006.01) |
| *B29C 53/04* | (2006.01) |
| *B29C 53/02* | (2006.01) |
| *E02D 5/22* | (2006.01) |
| *B29C 63/04* | (2006.01) |
| *B29C 65/48* | (2006.01) |
| *B29C 65/50* | (2006.01) |
| *B29C 65/54* | (2006.01) |
| *B29C 63/26* | (2006.01) |
| *B29C 63/18* | (2006.01) |
| *B29C 63/32* | (2006.01) |
| *B29C 63/22* | (2006.01) |
| *B29C 63/08* | (2006.01) |
| *B29C 63/30* | (2006.01) |
| *B29C 63/02* | (2006.01) |
| *B29C 63/00* | (2006.01) |

(52) U.S. Cl.
CPC .............. *B29C 63/08* (2013.01); *B29C 63/10* (2013.01); *B29C 63/18* (2013.01); *B29C 63/22* (2013.01); *B29C 63/26* (2013.01); *B29C 63/30* (2013.01); *B29C 63/32* (2013.01); *B29C 65/00* (2013.01); *B29C 65/48* (2013.01); *B29C 65/483* (2013.01); *B29C 65/50* (2013.01); *B29C 65/5057* (2013.01); *B29C 65/54* (2013.01); *E02D 5/22* (2013.01); *E02D 5/24* (2013.01); *E02D 5/60* (2013.01)

(56) References Cited

U.S. PATENT DOCUMENTS

| | | | | |
|---|---|---|---|---|
| 4,009,063 | A | | 2/1977 | Wood |
| 4,032,689 | A | | 6/1977 | Johnson et al. |
| 4,081,303 | A | | 3/1978 | Rogers et al. |
| 4,439,070 | A | * | 3/1984 | Dimmick ............... 405/216 |
| 4,559,974 | A | * | 12/1985 | Fawley ............... 138/172 |
| 4,699,703 | A | * | 10/1987 | Norman ............... 204/196.3 |
| 4,962,958 | A | | 10/1990 | Takei |
| 4,993,876 | A | * | 2/1991 | Snow et al. ............... 405/216 |
| 5,632,307 | A | * | 5/1997 | Fawley et al. ............... 138/99 |
| 5,677,046 | A | | 10/1997 | Fawley et al. |
| 5,683,530 | A | | 11/1997 | Fawley et al. |
| 5,836,357 | A | | 11/1998 | Kittson et al. |
| 5,931,198 | A | | 8/1999 | Raji et al. |
| 6,276,401 | B1 | * | 8/2001 | Wilson ............... 138/172 |
| 6,364,575 | B1 | * | 4/2002 | Bradley et al. ............... 405/216 |
| 7,096,890 | B2 | | 8/2006 | Woolstencroft et al. |
| 7,300,229 | B1 | * | 11/2007 | Fyfe et al. ............... 405/216 |

\* cited by examiner

REPAIR AND STRENGTHENING OF PILES AND PIPES WITH FRP LAMINATES

CROSS-REFERENCE TO RELATED APPLICATIONS

This application is a continuation-in-part of U.S. application Ser. No. 12/233,849, filed on Sep. 19, 2008, and claims the benefit of U.S. Provisional Patent Application 61/270,013, filed on Jul. 14, 2009, and U.S. Provisional Patent Application 61/205,906, filed on Feb. 6, 2009, and U.S. Provisional Patent Application 61/207,849, filed on Feb. 18, 2009, all incorporated herein by reference.

STATEMENT REGARDING FEDERALLY SPONSORED RESEARCH AND DEVELOPMENT

Not Applicable.

FIELD OF THE INVENTION

This invention relates to repair and strengthening vertical columns, and more particularly repairing and strengthening vertical columns using laminates.

DISCUSSION OF RELATED ART

A large number of steel, concrete or wooden piles are used along the coastlines to support structural members such as piers and docks. These elements are subjected to dry-wet cycles which over time cause significant deterioration. Salt water and other chemicals also attack these structures causing further deterioration. In a similar manner, off-shore structures are commonly supported on steel tubes. These steel tubes also suffer from corrosion damage in sea water. It is recognized that the splash zone region which consists of a portion of the pier several feet above and below the waterline is where most of the damage is concentrated.

Over the years, various products have been introduced to repair these structures. The common approach is to place a jacket around the damaged area and fill it with a grout or resin. This will enlarge the section that was lost due to deterioration and will also protect the remaining core of the original pile from future damage and will extend the life of the pile. The prior art teaches using composite Fiber Reinforced Polymer (FRP) materials but the shells usually have one or two seams along the height for ease of erection. Those seams are then fastened either by metallic screws or by bands that are wrapped around them. U.S. Pat. No. 7,300,229 to Fyfe et al. on Nov. 27, 2007 shows how to build a shell with fiberglass and wrap it around the pile and fill it with a grout.

The common problems with the prior art systems are many, including: (1) They require a metallic screw or band that may later corrode; (2) The filler can leak out of the vertical gaps; thus filler cannot be pressurized; (3) The vertical seams introduce a line of weakness in the system and if one tries to pressurize the filler inside the jacket, the jacket will burst at the seams; (4) Different size jackets are needed for different size piles or columns, making it difficult for contractors that have to stock various sizes in advance; (5) Little additional strength is provided by the jacket since it cannot be pressurized; (6) The inability to pressurize means that some of the voids and crevices in the deteriorated pile do not get completely filled; thus water can penetrate into the structure and deterioration may continue; (7) Installation is time consuming. Therefore, there is a need for a device that overcomes all of these shortcomings. The present invention accomplishes these objectives.

SUMMARY OF THE INVENTION

The present invention is a method for strengthening a vertical column, such as piles for piers and docks and columns in bridges and buildings. The method can be used for a variety of column materials, such as steel, concrete or wood and for a variety of column shapes such as round, square and rectangular columns. In a first embodiment of the method, a coiled Fiber Reinforced Polymer (FRP) laminate is provided. Next the laminate is wrapped in a helical fashion around the column, with the laminate overlapping itself by an overlap distance. An epoxy resin coating is applied between the overlapping portions of the laminate.

After waiting a period of time, the epoxy resin will then cure to form a shell having a lower end and an upper end, the shell being substantially water tight. Next, a plurality of sealing means is provided between the lower end and the upper end of the shell and the column. The space between the shell and the column is then filled with a filler material. In one embodiment, the space between the shell and the column is filled with a filler material under pressure until the filler material is substantially cured. In an alternate embodiment of the invention, the space between the shell and the column is filled with an expanding filler material.

Optionally, the coiled FRP laminate is provided having an adhesive strip substantially along one edge thereof. The adhesive strip is covered with a removable liner. The liner is removed to expose the adhesive strip between the overlapping portions of the laminate. In one embodiment, an upper end of the laminate is secured to itself with an attachment means. The attachment means may be a temporary wrapping means and a band of unidirectional fiber fabric saturated with the epoxy resin and wrapped around each end of the laminate.

In another embodiment, the coiled FRP laminate is provided and a plurality of spacers are fixed to the column and adapted to hold the laminate a set distance away from the column. Optionally, a plurality of rigid strengthening rods is added between the column and the shell after the epoxy resin has cured to further strengthen the column.

The present invention is a method for strengthening a vertical column that does not require a metallic screw or band that may corrode. This method avoids creating vertical gaps from where filler can leak and thus provides the benefit being able to pressurize the filler. Also, the method avoids the problems of a jacket bursting along vertical seams. Further, the invention avoids the need for different size jackets for different size piles or columns, avoiding the problem of contractors needing to stock various sizes in advance. The ability to pressurize the filler provides additional strength to the vertical column. Moreover the ability to pressurize means that the filler can fill the voids and crevices in the column; thus avoiding further deterioration from water penetrating into the column. Also, this method avoids the time consuming installation process of the prior art. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the apparatus and method of reinforcing a conduit or vessel are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Throughout this specification, the term "filler material" refers to any liquid or semi-liquid grout, resin, polymer-modified concrete and the like that can be used to fill the annular space between the Fiber Reinforced Polymer (FRP) shell and the host structure (e.g. pile or column). The filler material can be non-shrinking type or even expansive type, which after placement will expand.

Throughout this specification, the term "laminate" refers to any pre-cured and prefabricated FRP sheet products constructed in accordance to patent applications incorporated herein, and includes such fibers as glass, carbon, aramid, or the like, embedded in a resin matrix such as polyester, vinyl ester, epoxy, or the like. Such a laminate is relatively strong, having a tensile strength of at least 60,000 psi. Such a laminate is produced in a sheet that has a width ranging from typically 4 to 60 inches, a length of typically a few hundred feet, and a thickness of typically 0.015 to 0.05 inches, making it flexible enough to be coiled for storage and transportation and application. The present invention is a method for strengthening a vertical column 10 (FIG. 1), such as a pile 6 under a pier 8 (FIG. 7), columns in buildings or under bridges (not shown), or a utility pole (not shown). In a first embodiment of the method, a coiled FRP laminate 12 is provided, illustrated in FIG. 3. Next the laminate 12 is wrapped in a helical fashion around the column 10, with the laminate 12 having a width W overlapping itself by an overlap distance X, in FIGS. 1 and 2. An epoxy resin 14 (FIG. 1) coating is applied between the overlapping portions of the laminate 12. After waiting a period of time, the epoxy resin 14 will then cure to form a shell 30 having a lower end 32 and an upper end 38, the shell 30 being substantially water tight, illustrated in FIGS. 1 and 2.

Figure 1:
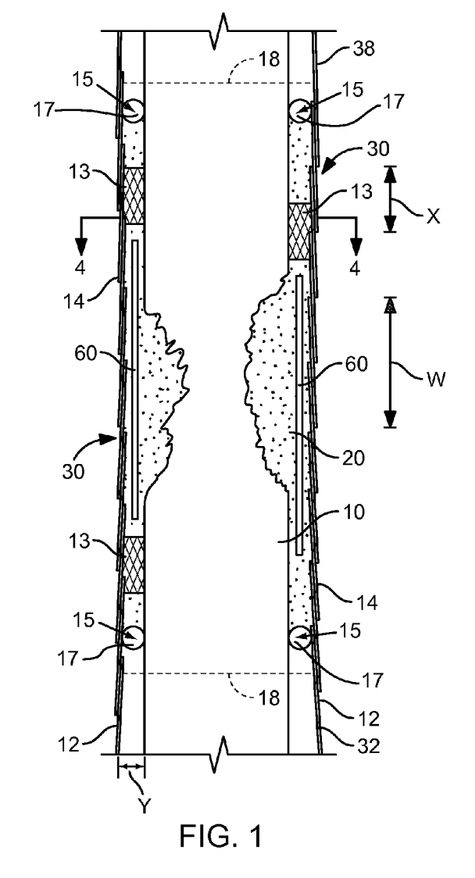
FIG. 1 is a side elevational cut-away view of an FRP laminate helically wrapped around a vertical column, illustrating spacers, strengthening rods, and sealing means.
Figure 2:
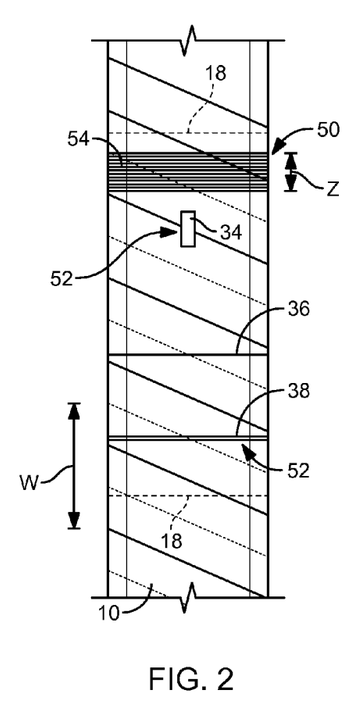
FIG. 2 is a side elevational view of an FRP laminate helically wrapped around a vertical column, illustrating an attachment means to secure the laminate.

Next, in FIG. 1, a plurality of sealing means 15 are provided between the lower end 32 and the upper end 38 of the shell 30 and the column 10. The sealing means 15 could also be an externally wrapped clamp, such as a hose clamp (not shown). The space between the shell 30 and the column 10 is then filled with a filler material 20. In one embodiment, the space between the shell 30 and the column 10 is filled with a filler material 20 under pressure until the filler material 20 is substantially cured. In an alternate embodiment of the invention, the space between the shell 30 and the column 10 is filled with an expanding filler material 20.

Figure 3:
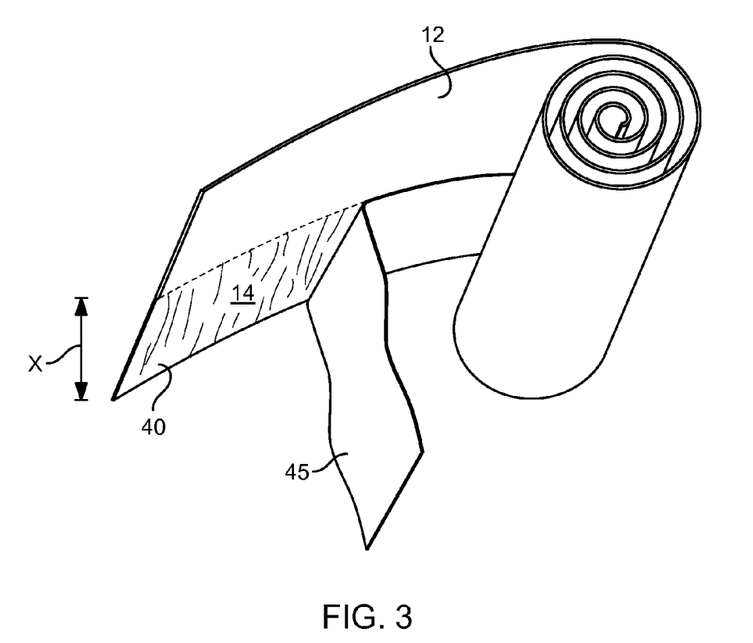
FIG. 3 is a perspective view of a coiled FRP laminate being unrolled, illustrating an adhesive strip and a removable liner.
Figure 6A:
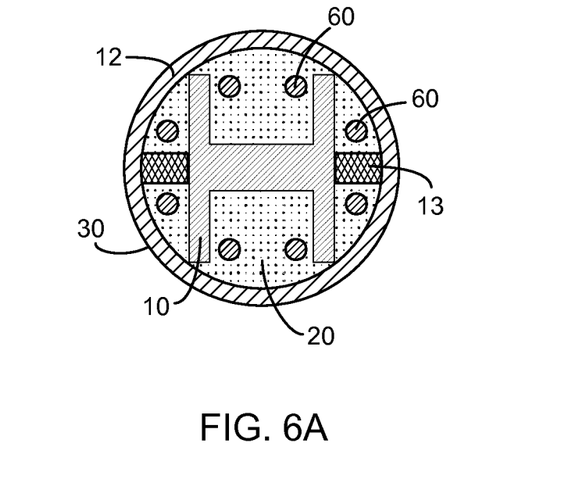
FIG. 6A is a cross sectional view illustrating a steel column, taken generally along lines 4-4 of FIG. 1.
Figure 6B:
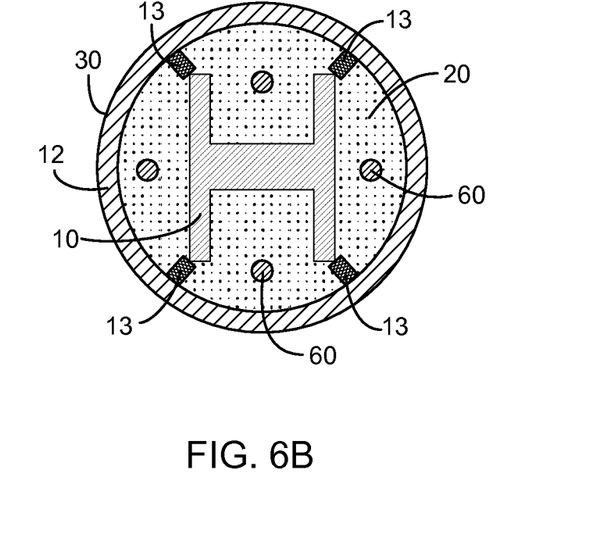
FIG. 6B is a cross sectional view illustrating a steel column, taken generally along lines 4-4 of FIG. 1.
Figure 7:
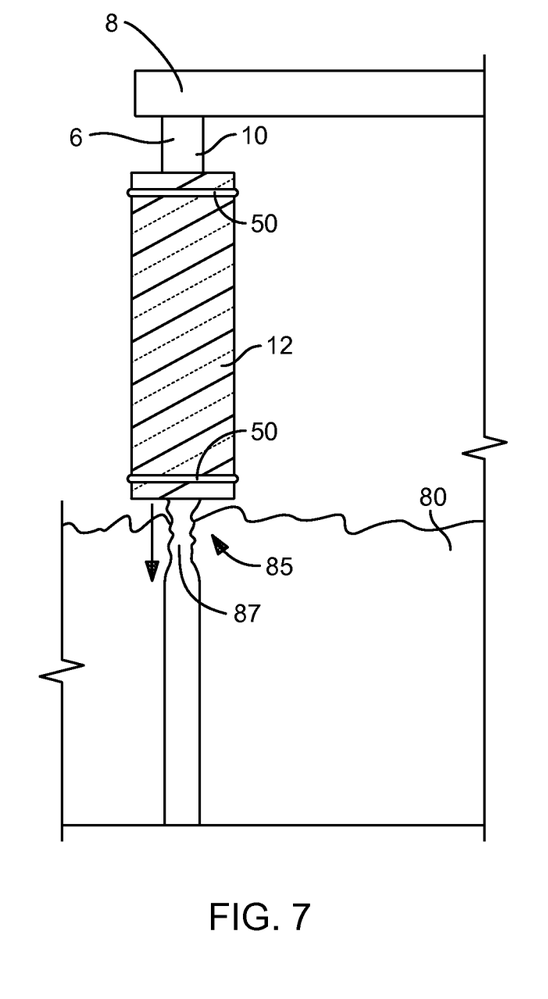
FIG. 7 is a side elevational view of an FRP laminate helically wrapped around a vertical column prior to being submerged in water.

Optionally, as illustrated in FIG. 3, the coiled FRP laminate 12 is provided having an adhesive strip 40 substantially along one edge thereof. The adhesive strip 40 is covered with a removable liner 45. The liner 45 is removed to expose the adhesive strip 40 between the overlapping portions of the laminate 12. In one embodiment, the upper end 38 of the laminate 12 is secured to itself with an attachment means 50, illustrated in FIGS. 2 and 6. The lower end 32 may also be secured with an attachment means 50, if desired, as illustrated in FIG. 7. In one embodiment, the attachment means 50 is a temporary wrapping means 52 and a band of unidirectional fiber fabric 54 saturated with the epoxy resin 14 and wrapped around each end of the laminate 12, illustrated in FIG. 2. In another embodiment, the attachment means 50 is the temporary wrapping means 52 surrounded by the band of unidirectional fiber fabric 54 saturated with the epoxy resin 14.

Figure 4:
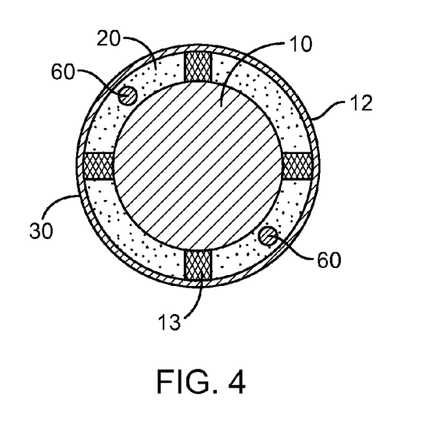
FIG. 4 is a cross sectional view illustrating a cylindrical column, taken generally along lines 4-4 of FIG. 1.

In another embodiment in FIGS. 1 and 4, the coiled FRP laminate 12 is provided and a plurality of spacers 13 fixed to the column 10 and adapted to hold the laminate 12 a set distance Y away from the column 10. Optionally in FIGS. 1 and 4, a plurality of rigid strengthening rods 60 are added between the column 10 and the shell 30 to further strengthen the column 10. The rods 60 may be supported by a plurality of spacers (not shown) along the height of the column 10 to secure their position parallel to the longitudinal axis of the column 10 while the filler material 20 is placed.

In an alternate embodiment of the invention, illustrated in FIG. 7, the vertical column 10 is strengthened while partially submerged in water 80 at a waterline 85 thereof. The coiled FRP laminate 12 is provided and wrapped in a helical fashion around the column 10 above the water 80, starting at or above the waterline 85 and winding its way upwards toward the top of the column 10 to form the shell 30. The laminate 12 overlaps itself by an overlap distance X. The epoxy resin 14 coating is applied between the overlapping portions of the laminate 12. Preferably, the layer of epoxy resin 14, such as QuakeBond™ J201TC by QuakeWrap, Inc., is applied to the overlapping portion of the laminate 12 so that as the laminate 12 is wound, the solid cylindrical shell 30 is formed. After waiting until the epoxy resin 14 has cured to form the shell 30, the shell 30 is substantially water tight. Next, the shell 30 is moved down at least partially in the water 80 to cover the waterline 85. Then the sealing means 15 is provided between the lower end 32 of the shell 30 and the column 10. The space between the shell 30 and the column 10 is then filled with the filler material 20 and any water 80 in the space will be displaced by the filler material 20. Next, the sealing means 15 is provided between the upper end 38 of the shell 30 and the column 10. In an alternate embodiment, the plurality of sealing means 15 are provided between the lower end 32 and the upper end 38 of the shell 30 and the column 10, and then, the space between the shell 30 and the column 10 is filled with the filler material 20.

In another embodiment of the invention, an epoxy resin 14 is used that is curable when submerged in water. One of the ways to install the shell 30 around a pile 6 in water 80 is that after getting a couple of turns of the laminate 12 wrapped around the column 10 above the waterline 85, then the partially completed shell 30 can be pushed into the water 30 and allow the epoxy resin 14 to cure in the water 80. This process of building a couple of turns and pushing the shell 30 further into the water 80 will continue until the entire shell 30 is constructed. This has a major advantage that eliminates the need for costly divers. A diver (not shown) may be used, if desired, to fix the sealing means 15 at the lower end of the shell 30 in the water 80. Alternatively, the sealing means 15 can be attached to the lower end of the shell 30 before being pushed into water 80. In this way, when the shell 30 is completed, the sealing means 15 is in place and there is no need for using a diver.

The overlap distance X is determined based on engineering calculations and a determination of the required thickness of the shell 30. For example, if we require a minimum shell thickness of two times the thickness of the laminate 12, then the overlap distance X will be at least one half of the laminate width W. Although the laminate 12 has a tendency to remain flat, the starting point of the laminate 12 shown as the lower portion of the shell 30 is tucked under the next full wrap so it is forced to stay in the coiled position and cannot become flat. The subsequent wraps are temporarily held in contact with the aid of the epoxy resin 14 until the last wrap of the laminate 12 (the last turn) which will not want to remain in the coiled position. This last wrap is temporarily held in position with the temporary wrapping means 52 such as duct tape 34 (FIG. 2), a tied rope, steel strap, or other devices (not shown) while a more permanent solution is provided.

The permanent part of the attachment means 50 could for example be a band of a unidirectional glass or carbon fiber fabric 54 such as VU18C supplied by QuakeWrap, Inc., having a width Z (FIG. 2) and being saturated with an epoxy resin such as QuakeBond™ J300SR, for example. The band of fiber fabric 54 is wrapped a few times in a circular ring around the most top portion of the shell 30 in an overlapping manner to produce an FRP shell 30 a few layers thick with excellent strength and corrosion resistant properties. Once this wet band 54 cures we have a solid single piece, an extremely strong shell 30 sitting loosely around the column 10 which, unlike other products, has no seams along the vertical sides. If desired, the edges of the laminate 12 that extend at the beginning and end of the laminate 12 can be trimmed with a saw along lines 18 (FIGS. 1 and 2), resulting in a substantially cylindrical shell 30.

This shell 30 can now be lowered into water 80 such that it covers the entire height of the damaged splash zone 87 at the waterline 85 or any part of the pile 6 that requires repair. In this embodiment, to fill the annular space between the shell 30 and the pile 6, the bottom opening must be closed; this can be done for example by using the sealing means 15, such as a rubber tube 17 placed in the annular space and inflated with air to provide a tight seal at the bottom. Then the filler material 20 will be placed into the annular space; this can be done by pouring the filler material 20 from the top or by placing small tubes like PVC pipe or copper tubing (not shown) inside the annular space in a vertical orientation and then introducing the filler material 20 into the pipes from the top and gradually lift up the pipes as the filler material 20 is added to the bottom of the annular space. The filler material 20 also forces the water 80 that is trapped at the bottom of the annular space to come up to the top and ultimately spill over when using filler material 20 that is heavier than water 80. Alternatively the water 80 can be pumped out of the annular space. Once this is completed, the entire annular space is filled with filler material 20 and the top of the shell 30 can be sealed similar to the bottom with an inflated tube 17, for example. Then, in one embodiment, the filler material 20 in the annular space is pressurized with air or other systems commonly known to those skilled in the art. This will cause the filler material 20 to fill voids in the damaged pile 6 and also place the shell 30 under hoop stresses, also known as providing active confinement for the column 10.

In another embodiment of the invention, the filler material 20 could be of the expansive type so that once placed, the filler material 20 will expand and this expansion will place tension (hoop stresses) in the shell 30. The shell 30 constructed according to this invention is strong and cylindrical with no vertical seams allowing the filler material 20 to be pressurized significantly, forcing the filler material 20 to penetrate the voids and crevices in the damaged column 10. The shell 30 is resistant to corrosion and serves as a protective layer that will prevent oxygen or water to penetrate in and reach the pile 6. As it is commonly known, oxygen is necessary as a fuel for the corrosion process to continue and the shell 30 will substantially prevent the flow of oxygen to the column 10.

In another embodiment of this invention, the laminate 12 that are manufactured can be coated with the adhesive strip 40 such as a glue or epoxy on the face which is to be overlapped to form the shell 30 (e.g., one half of the width of the laminate 12 on one face). This area is the same area where previously described as being coated with J201TC tack coat epoxy. In this embodiment, the area that is coated with adhesive strip 40 is protected with removable liner 45, such as a nonstick paper for example. In the field, during installation, the removable liner 45 is removed, exposing the adhesive strip 40 that would be bonded to the rest of the laminate 12 to form the continuous cylinder-like shell 30.

In addition to applications for piles 6 in water 80, the method has many other useful applications and embodiments, such as application to columns 10 in bridges and buildings (not shown) and to utility poles (not shown). In this case, the shell 30 can be made by either starting the wrapping from bottom of the column 10 to the top or vice versa. In one embodiment of this invention, the laminate 12 is wrapped around the column 10 using spacers 13 to form the solid shell 30 around the column and an annular space between the shell 30 and the column 10. Then the annular space is filled with the filler material 20. In this case, there is no need to first repair and smooth the surface of the column 10; the smooth outer surface of the shell 30 is all that will remain visible and due to the shell's stiffness, this shell 30 will remain smooth and the shell's outer appearance will not be adversely affected by the presence of any irregularities on the outer surface of the host column 10. The elimination of the step to repair or smooth the surface of the column 10 will reduce the overall time and repair cost significantly.

In another embodiment, the filler material 20 can be of a much stronger material than the original column 10. Thus the axial load carrying capacity of the new column 10 will be further enhanced by the presence of this outer shell 30 constructed using higher strength filler material 20. In some cases, multiple layers of fabric (not shown) are used to "build up" a thicker final laminate 12 in the field. In such cases, the laminate 12 can be constructed with two or more layers (plies)

of fabric placed on top of one another, resulting in an even stronger laminate 12. One layer of such laminate 12 may be sufficient to strengthen the column 10; in other words, one layer of such laminate 12 can replace two or more layers of fabrics that would have been applied by the prior art wet layup method.

Figure 5:
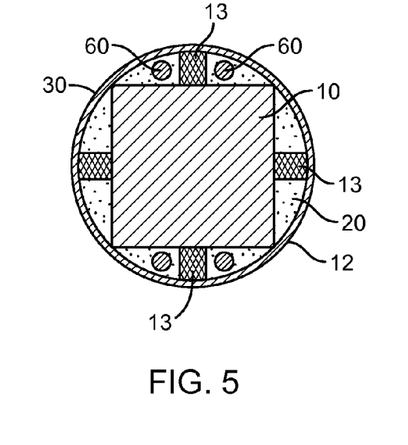
FIG. 5 is a cross sectional view illustrating a square column, taken generally along lines 4-4 of FIG. 1.

Additional applications of the method include square and rectangular columns 10, as illustrated in FIG. 5. In addition to all the advantages mentioned in this document for repair and strengthening circular columns 10, there is an additional advantage for this invention as it relates to rectangular columns 10. Confining pressure offered by a circular hoop is uniform and more effective than that offered by a rectangular or square hoop (not shown). As a result, it is desirable, for example, to make the square column 10 round before it is confined by wrapping it with FRP or any other material such as steel, for that matter.

Using the technique presented in this invention, the FRP laminate 12 can be wrapped around the square column 10 either using the spacer 13 to increase the column size or by allowing the FRP laminate 12 to touch the column 10 at the four corners, illustrated in FIG. 5. Then the annular space between the shell 30 and the square column 10 can be filled with the filler material 20. This is much easier and more economical than the prior art. Moreover, if desired the filler material 20 can be pressurized at the same time that it is being placed, further increasing the strength and stiffness of the square host column 10. Additional applications of the method include using the method on steel columns 10, as illustrated in FIG. 6A. Steel columns 10 are also easily subject to corrosion and deterioration. In one embodiment of this invention, the steel column 10 is first cleaned of any rust and the column 10 can be coated with corrosion inhibitor coatings (not shown). Then, similar to the procedures described above, the laminate 12 will be wrapped around the column 10 to form the strong structural shell 30. If desired, spacers 13 can also be included along the height of the column 10 to allow the solid shell 30 to be larger than the steel column 10 and to prevent touching of the shell 30 and the steel column 10, as illustrated in FIG. 6B. If the shell 30 is made of carbon fabric, spacers 13 are preferred because when steel and carbon come in contact, galvanic corrosion takes place.

Next, the bottom portion of the gap between the shell 30 and steel column 10 is sealed and the filler material 20 is placed in the annular space between the steel column 10 and the shell 30. The filler material 20 will preferably be a nonshrink or expansive high strength and high modulus grout or concrete which will add significant load carrying capacity to the steel column 10. Again, upon filling the annular space with the filler material 20, the top portion of it can be sealed and the filler material 20 can be pressurized to place the shell 30 in tension in the hoop direction. This method will not only increase the axial load capacity of the column 10 by the fact that the newly introduced filler material 20 can take a lot of compressive load, it will also increase the slenderness ratio for the steel column 10, thereby increasing the buckling load of the column 10 significantly.

In another embodiment, after the steel column 10 is cleaned to remove rust, carbon FRP laminates such as QuakeWrap's DU50C are bonded with an epoxy such as QuakeBond J201TC to the flanges of the steel column 10 and then the column 10 is wrapped in the FRP shell 30 and the annular space filled with the filler material 20 and if needed, pressurized.

In another embodiment of this invention, rigid strengthening rods 60, such as steel or nonmetallic reinforcing bars, are placed parallel to the axis of the column 10 (i.e. vertically) and then the FRP shell 30 is constructed around the column 10 and the strengthening rods 60. Then the annular space is filled with the filler material 20 and if needed, pressurized.

While a particular form of the invention has been illustrated and described, it will be apparent that various modifications can be made without departing from the spirit and scope of the invention. For example, equivalents of the materials may be used for the methods described. Also, multiple shells 30 may be formed around a single column 10 as desired. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A method of strengthening a column, comprising the steps of:
   a) Using a laminate flexible enough to be coiled for storage, transportation, and application;
   b) Creating a permanent and seamless shell by wrapping the laminate continuously around the column more than once and at a distance from a desired portion of the column, the laminate overlapping itself circumferentially by an overlap distance, and applying an epoxy resin coating between the overlapping portions of the laminate, wherein the laminate and/or the shell are not preformed or prefabricated for any particular shape and/or size column and the same laminate is applicable to any other cross-sectional size and shape column, and wherein the structural strength of the column is adjustable to any desired level by the number of laminate layers, and wherein the created shell does not have a vertical seam along the height of the column;
   c) Sealing the space between lower end of the shell and the column or lower end and upper end of the shell and the column; and
   d) Filling the space between the shell and the column with a filler material.

2. The method of claim 1 wherein step d) is filling the space between the shell and the column with a filler material under pressure and subsequently waiting until the filler material is substantially cured.

3. The method of claim 1 wherein step d) is filling the space between the shell and the column with an expanding filler material.

4. The method of claim 1 wherein step a) is providing coiled FRP laminate having an adhesive strip substantially along one edge thereof, the adhesive strip covered with a removable liner, and wherein step b) is wrapping the laminate in a helical fashion around the column, the laminate overlapping itself by an overlapping distance, the liner being removed to expose the adhesive strip between the overlapping portions thereof.

5. The method of claim 1 further including step b') after step b) of securing an upper end of the laminate to itself with an attachment device.

6. The method of claim 5 wherein the attachment device is a temporary wrapping device and a band of unidirectional fiber fabric saturated with the epoxy resin and wrapped around each end of the laminate.

7. The method of claim 1 wherein step a) is providing a coiled FRP laminate and a plurality of spacers fixed to the column and adapted to hold the laminate a set distance away from the column.

8. The method of claim 1 further including step b') after step b) of adding a plurality of rigid strengthening rods between the column and the shell.

* * * * *